US006562907B2

(12) United States Patent
Johoji et al.

(10) Patent No.: US 6,562,907 B2
(45) Date of Patent: May 13, 2003

(54) OLEFIN POLYMER AND THERMOPLASTIC RESIN COMPOSITION

(75) Inventors: Hirofumi Johoji, Ichihara (JP); Hidetake Hozumi, Ichihara (JP); Tadaaki Nishiyama, Ichihara (JP)

(73) Assignee: Sumitomo Chemical Company, Limited, Osaka (JP)

(*) Notice: Subject to any disclaimer, the term of this patent is extended or adjusted under 35 U.S.C. 154(b) by 0 days.

(21) Appl. No.: 09/993,636

(22) Filed: Nov. 27, 2001

(65) Prior Publication Data

US 2002/0120065 A1 Aug. 29, 2002

(30) Foreign Application Priority Data

Nov. 30, 2000 (JP) ........................................ 2000-364501
Mar. 22, 2001 (JP) ........................................ 2001-082242

(51) Int. Cl.$^7$ ............................ C08L 9/00; C08L 23/04; C08L 23/14; C08L 25/02; C08L 45/00
(52) U.S. Cl. ..................... 525/191; 525/216; 525/232; 525/240; 525/241; 428/500
(58) Field of Search ................................ 525/191, 216, 525/232, 240, 241; 428/500

(56) References Cited

U.S. PATENT DOCUMENTS 6,342,565 B1 * 1/2002 Cheng et al. ............... 525/191

FOREIGN PATENT DOCUMENTS

| DE | 198 30 996 A1 | 1/1999 |
| EP | 0 842 955 A2 | 5/1998 |
| WO | WO 96/23838 A1 | 8/1996 |
| WO | WO 00/01766 A1 | 1/2000 |
| WO | WO 00/69963 A1 | 11/2000 |

* cited by examiner

Primary Examiner—Nathan M. Nutter
(74) Attorney, Agent, or Firm—Sughrue Mion, PLLC

(57) ABSTRACT

There is provided an olefin polymer having an elastic recovery of from 70 to 100% defined by the following formula (1), $$\text{Elastic recovery} = \text{stress-residual deformation recovery} \times 100/\text{stretch deformation} \qquad (1)$$

wherein the stress-residual deformation recovery and the stretch deformation are obtained from a 100% strain hysteresis curve of a resin composition comprising 70 parts by weight of the olefin polymer and 30 parts by weight of one specific propylene-ethylene copolymer resin, provided that at least one resin composition satisfies the above-defined value of elastic recovery.

6 Claims, No Drawings

OLEFIN POLYMER AND THERMOPLASTIC RESIN COMPOSITION

FIELD OF THE INVENTION

The present invention relates to (i) an olefin polymer (ii) a thermoplastic resin composition comprising said olefin polymer and a thermoplastic resin, which thermoplastic resin composition is superior in balance among flexibility, scratch resistance, tensile elongation characteristics, resistance to whitening on bending and stability of surface properties, (iii) a sheet and a tube comprising said thermoplastic resin composition, and (iv) a laminate comprising a layer which comprises said thermoplastic resin composition. In the present invention, the term "sheet" also means a film, and the term "tube" also means a hose.

BACKGROUND OF THE INVENTION

As disclosed in JP-A 7-102126, a non-rigid thermoplastic resin composition comprising an ethylene-α-olefin copolymer and a crystalline polypropylene resin is expected to become an alternative material of a plasticized vinyl chloride resin. However, as disclosed in JP-A 8-301927, said composition has a problem of stickiness caused by the ethylene-α-olefin copolymer. In order to solve the problem, JP-A 8-301927 and JP-A 9-104720 disclose a method, according to which method the ethylene-α-olefin copolymer is crosslinked by an electronic ray or a peroxide, but the problem of stickiness is not sufficiently solved.

JP-A 11-193309 and JP-A 11-80233 disclose a non-rigid olefin material, which contains no chlorine and is superior in physical properties such as flexibility. However, such a non-rigid material is yet insufficient for uses or specifications, in which a higher performance is required.

Particularly, in the field of skin materials and non-rigid molding materials, it is desired to develop an olefin copolymer capable of giving a thermoplastic resin composition superior in balance among flexibility, scratch resistance, tensile elongation characteristics, resistance to whitening on bending and stability of surface properties.

SUMMARY OF THE INVENTION

An object of the present invention is to provide an olefin polymer capable of giving a thermoplastic resin composition superior in balance among flexibility, scratch resistance, tensile elongation characteristics, resistance to whitening on bending and stability of surface properties, when used in combination with a thermoplastic resin.

Another object of the present invention is to provide a thermoplastic resin composition comprising such an olefin polymer.

Further object of the present invention is to provide a sheet comprising such a thermoplastic resin composition.

The present inventors have undertaken extensive studies to accomplish the above-mentioned objects. As a result, it has been found that an olefin polymer having specific characteristics and specific physical properties can meet said objects. Thereby, the present invention has been obtained.

The present invention provides an olefin polymer having an elastic recovery of from 70 to 100% defined by the following formula (1), $$\text{Elastic recovery} = \text{stress-residual deformation recovery} \times 100 / \text{stretch deformation} \quad (1)$$

wherein the stress-residual deformation recovery and the stretch deformation are obtained from a 100% strain hysteresis curve of a resin composition consisting essentially of 70 parts by weight of the olefin polymer and 30 parts by weight of one polypropylene resin selected from the group consisting of the following polymers (A) and (B), provided that at least one resin composition satisfies the above-defined value of elastic recovery, (A) a propylene-ethylene copolymer, which has a melt flow rate of 3.0±0.5 g/10 min. measured at a temperature of 230° C. under a load of 2.16 kg, a main peak position (melting point) of 145±2° C. in a crystal melting measured according to JIS K7121 with a differential scanning calorimeter (DSC), and a crystal melting calorie of 87±5 J/g measured according to JIS K7122 with a differential scanning calorimeter (DSC), and (B) a propylene-ethylene copolymer, which has a melt flow rate of 1.5±0.3 g/10 min. measured at a temperature of 230° C. under a load of 2.16 kg, a main peak position (melting point) of 135±2° C. in a crystal melting measured according to JIS K7121 using a differential scanning calorimeter (DSC), and a crystal melting calorie of 60±5 J/g measured according to JIS K7122 with a differential scanning calorimeter (DSC), wherein the sample to be measured with a differential scanning calorimeter is prepared according to a process prescribed in JIS K7121 3(2).

The present invention also provides a thermoplastic resin composition comprising from 99 to 1% by weight of the above-defined olefin polymer and from 1 to 99% by weight of a thermoplastic resin.

Further, the present invention provides a sheet and a tube, which comprise said thermoplastic resin composition.

Still further, the present invention provides a laminate, which comprises a layer comprising said thermoplastic resin composition.

DETAILED DESCRIPTION OF THE INVENTION

The olefin polymer in accordance with the present invention means a copolymer of more than one compound selected from the group consisting of ethylene, α-olefins having 3 to 20 carbon atoms, polyene compounds, cyclic olefins and vinyl aromatic compounds, or means a homopolymer of these compounds. Among those olefin polymers, a random copolymer is preferable from a viewpoint of stability of surface properties and flexibility of the thermoplastic resin composition obtained.

As examples of the above-mentioned α-olefins having 3 to 20 carbon atoms, polyene compounds, cyclic olefins and vinyl aromatic compounds, the following compounds can be enumerated.

1. α-Olefin Having 3 to 20 Carbon Atoms

As such an α-olefin, linear and branched α-olefins are exemplified. Specific examples of the linear and branched α-olefin are propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nanodecene and 1-eicocene. Specific examples of the branched α-olefin are 3-methyl-1-butene, 3-methyl-1-pentene, 4-methyl-1-pentene, 2-ethyl-1-hexene and 2,2,4-trimethyl-1-pentene. Of these, propylene, 1-butene, 1-pentene, 1-hexene, 1-octene, 1-decene, 3-methyl-1-pentene, 3-methyl-1-butene and 4-methyl-1-pentene are preferred.

2. Polyene Compound

As the polyene compound, both a conjugated polyene compound and a non-conjugated polyene compound are preferred. The polyene compound includes, for example, an aliphatic conjugated polyene compound and an alicyclic conjugated polyene compound. As the aliphatic conjugated polyene compound, a linear aliphatic conjugated polyene compound and a branched aliphatic conjugated polyene compound are exemplified. The aliphatic conjugated polyene compound and the alicyclic conjugated polyene compound may contain a group such as an alkoxy group, an aryl group, an aryloxy group, an aralkyl group and an aralkyloxy group.

Specific examples of the aliphatic conjugated polyene compound are 1,3-butadiene, isoprene, 2-ethyl-1,3-butadiene, 2-propyl-1,3-butadiene, 2-isopropyl-1,3-butadiene, 2-hexyl-1,3-butadiene, 2,3-dimethyl-1,3-butadiene, 2,3-diethyl-1,3-butadiene, 2-chloro-1,3-butadiene, 2,3-dichloro-1,3-butadiene, 1-fluoro-1,3-butadiene, 2-chloro-1,3-pentadiene, 2-methyl-1,3-pentadiene, 2-methyl-1,3-hexadiene, 2-methyl-1,3-octadiene, 2-methyl-1,3-decadiene, 2,3-dimethyl-1,3-pentadiene, 2,3-dimethyl-1,3-hexadiene, 2,3-dimethyl-1,3-octadiene and 2,3-dimethyl-1,3-decadiene.

Specific examples of the alicyclic conjugated polyene compound are 2-methyl-1,3-cyclopentadiene, 2-mehtyl-1,3-cyclohexadiene, 2,3-dimethyl-1,3-cyclopentadiene, 2,3-dimethyl-1,3-cyclohexadiene, 2-chloro-1,3-cyclopentadiene and 2-chloro-1,3-cyclohexadiene.

The non-conjugated polyene compound includes, for example, an aliphatic non-conjugated polyene compound, an alicyclic non-conjugated polyene compound and an aromatic non-conjugated polyene compound. As the aliphatic non-conjugated polyene compound, a linear aliphatic non-conjugated polyene compound and a branched aliphatic non-conjugated polyene compound are exemplified. The aliphatic non-conjugated polyene compound, the alicyclic non-conjugated polyene compound and the aromatic non-conjugated polyene compound may contain a group such as an alkoxy group, an aryl group, an aryloxy group, an aralkyl group and an aralkyloxy group.

Specific examples of the aliphatic non-conjugated polyene compound are 1,4-hexadiene, 1,5-hexadiene, 1,6-heptadiene, 1,6-octadiene, 1,7-octadiene, 1,8-nonadiene, 1,9-decadiene, 1,13-tetradecadiene, 1,5,9-decatriene, 3-methyl-1,4-hexadiene, 4-methyl-1,4-hexadiene, 5-methyl-1,4-hexadiene, 4-ethyl-1,4-hexadiene, 3-methyl-1,5-hexadiene, 3,3-dimethyl-1,4-hexadiene, 3,4-dimethyl-1,5-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 3-methyl-1,6-heptadiene, 4-methyl-1,6-heptadiene, 4,4-dimethyl-1,6-heptadiene, 4-ethyl-1,6-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethy-1,6-octadiene, 6-propyl-1,6-octadiene, 6-butyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 6-methyl-1,6-undecadiene, 9-methyl-1,8-undecadiene, 6,10-dimethyl-1,5,9-undecatriene, 5,9-dimethyl-1,4,8-decatriene, 4-ethylidene-8-methyl-1,7-nonadiene, 13-ethyl-9-methyl-1,9,12-pentadecatriene, 5,9,13-trimethyl-1,4,8,12-tetradecadiene, 8,14,16-trimethyl-1,7,14-hexadecatriene and 4-ethylidene-12-methyl-1,11-pentadecadiene.

Specific examples of the alicyclic non-conjugated polyene compound are vinylcyclohexene, 5-vinyl-2-norbornene, 5-ethylidene-2-norbornene, 5-methylene-2-norbornene, 5-isopropenyl-2-norbornene, cyclohexadiene, dicyclopentadiene, cyclooctadiene, 2,5-norbornadiene, 2-methyl-2,5-norbornadiene, 2-ethyl-2,5-norbornadiene, 2,3-diisopropylidene-5-norbornene, 2-ethylidene-3-isopropylidene-5-norbornene, 6-chloromethyl-5-isopropenyl-2-norbornene, 1,4-divinylcyclohexane, 1,3-divinylcyclohexane, 1,3-divinylcyclopentane, 1,5-divinylcyclooctane, 1-allyl-4-vinylcyclohexane, 1,4-diallylcyclohexane, 1-allyl-5-vinylcyclooctane, 1,5-diallylcyclooctane, 1-allyl-4-isopropenylcyclohexane, 1-isopropenyl-4-vinylcyclohexane, 1-isopropenyl-3-vinylcyclopentane and methyltetrahydroindene.

Specific examples of the aromatic non-conjugated polyene compound are divinylbenzene and vinylisopropenylbenzene.

3. Cyclic Olefin Compound

Specific examples of the cyclic olefin compound are norbornene, 5-methylnorbornene, 5-ethylnorbornene, 5-propylnorbornene, 5,6-dimethylnorbornene, 1-methylnorbornene, 7-methylnorbornene, 5,5,6-trimethylnorbornene, 5-phenylnorbornene, 5-benzylnorbornene, 5-ethylidenenorbornene, 5-vinylnorbornene, 1,4,5,8-dimethano-1,2,3,4,4a,5,8,8a-octahydronapthalene, 2-methyl-1,4,5,8-dimethano-1,2,3,4,4a,5,8,8a-octahydronapthalene, 2-ethyl-1,4,5,8-dimethano-1,2,3,4,4a,5,8,8a-octahydronapthalene, 2,3-dimethyl-1,4,5,8-dimethano-1,2,3,4,4a,5,8,8a-octahydronapthalene, 2-hexyl-1,4,5,8-dimethano-1,2,3,4,4a,5,8,8a-octahydronapthalene, 2-ethylidene-1,4,5,8-dimethano-1,2,3,4,4a,5,8,8a-octahydronapthalene, 2-fluoro-1,4,5,8-dimethano-1,2,3,4,4a,5,8,8a-octahydronapthalene, 1,5-dimethyl-1,4,5,8-dimethano-1,2,3,4,4a,5,8,8a-octahydronapthalene, 2-cyclohexyl-1,4,5,8-dimethano-1,2,3,4,4a,5,8,8a-octahydronapthalene, 2,3-dichloro-1,4,5,8-dimethano-1,2,3,4,4a,5,8,8a-octahydronapthalene, 2-isobutyl-1,4,5,8-dimethano-1,2,3,4,4a,5,8,8a-octahydronapthalene, 1,2-dihydrodicyclopentadiene, 5-chloronorbornene, 5,5-dichloronorbornene, 5-fluoronorbornene, 5,5,6-trifluoro-6-trifluoromethylnorbornene, 5-chloromethylnorbornene, 5-methoxynorbornene, 5,6-dicarboxylnorbornene anhydrate, 5-dimethylaminonorbornene, 5-cyanonorbornene, cyclopentene, 3-methylcyclopentene, 4-methylcyclopentene, 3,4-dimethylcyclopentene, 3,5-dimethylcyclopenetene, 3-chlorocyclopentene, cyclohexene, 3-methylcyclohexene, 4-methylcyclohexene, 3,4-dimethylcyclohexene, 3-chlorocyclohexene and cycloheptene.

4. Vinyl Aromatic Compound

Specific examples of the vinyl aromatic compound are styrene, β-methylstyrene, p-methylstyrene, vinylxylene, monochlorostyrene, dichlorostyrene, monobromostyrene, dibromostyrene, fluorostyrene, p-tert-butylstyrene, ethylstyrene and vinylnaphthalene.

From a viewpoint of flexibility, scratch resistance, tensile elongation characteristics and resistance to whitening on bending of the thermoplastic resin composition in accordance with the present invention, the following polymers 1 to 19 are preferable as the olefin polymer.

1. Olefin polymers obtained by copolymerizing ethylene and at least one a-olefin having 3 to 20 carbon atoms, and if desired, at least one compound selected from the group consisting of the polyene compounds, the cyclic olefin compounds and the vinyl aromatic compounds.

2. Olefin polymers obtained by copolymerizing ethylene and at least one a-olefin having 4 to 20 carbon atoms, and if desired, at least one compound selected from the group consisting of the polyene compounds, the cyclic olefin compounds and the vinyl aromatic compounds.

3. Olefin polymers obtained by copolymerizing ethylene, propylene and at least one α-olefin having 4 to 20 carbon atoms, and if desired, at least one compound selected from the group consisting of the polyene compounds, the cyclic olefin compounds and the vinyl aromatic compounds.

4. Olefin polymers obtained by copolymerizing propylene and at least one α-olefin having 4 to 20 carbon atoms, and if desired, at least one compound selected from the group consisting of the polyene compounds, the cyclic olefin compounds and the vinyl aromatic compounds.

5. Olefin polymers obtained by copolymerizing ethylene and at least one α-olefin having 4 to 20 carbon atoms.

6. Olefin polymers obtained by copolymerizing ethylene, at least one α-olefin having 4 to 20 carbon atoms, and at least one polyene compound.

7. Olefin polymers obtained by copolymerizing ethylene, at least one a-olefin having 4 to 20 carbon atoms, and at least one cyclic olefin compound.

8. Olefin polymers obtained by copolymerizing ethylene, at least one α-olefin having 4 to 20 carbon atoms, and at least one vinyl aromatic compound.

9. Olefin polymers obtained by copolymerizing ethylene, at least one α-olefin having 4 to 20 carbon atoms, at least one polyene compound, and at least one vinyl aromatic compound.

10. Olefin polymers obtained by copolymerizing ethylene, propylene, and at least one α-olefin having 4 to 20 carbon atoms.

11. Olefin polymers obtained by copolymerizing ethylene, propylene, at least one α-olefin having 4 to 20 carbon atoms, and at least one polyene compound.

12. Olefin polymers obtained by copolymerizing ethylene, propylene, at least one α-olef in having 4 to 20 carbon atoms, and at least one cyclic olefin compound.

13. Olefin polymers obtained by copolymerizing ethylene, propylene, at least one α-olefin having 4 to 20 carbon atoms, and at least one vinyl aromatic compound.

14. Olefin polymers obtained by copolymerizing ethylene, propylene, at least one α-olefin having 4 to 20 carbon atoms, at least one polyene compound, and at least one vinyl aromatic compound.

15. Olefin polymers obtained by copolymerizing propylene and at least one α-olefin having 4 to 20 carbon atoms.

16. Olefin polymers obtained by copolymerizing propylene, at least one α-olefin having 4 to 20 carbon atoms, and at least one polyene compound.

17. Olefin polymers obtained by copolymerizing propylene, at least one α-olefin having 4 to 20 carbon atoms and at least one cyclic olefin compound.

18. Olefin polymers obtained by copolymerizing propylene, at least one α-olefin having 4 to 20 carbon atoms, and at least one vinyl aromatic compound.

19. Olefin polymers obtained by copolymerizing propylene, at least one α-olefin having 4 to 20 carbon atoms, at least one polyene compound and at least one vinyl aromatic compound.

Among the above-mentioned polymers 1 to 19, the polymers 2 and 3 are preferable when the olefin polymer and thermoplastic resin composition in accordance with the present invention are required to have low temperature resistance.

The olefin polymer in accordance with the present invention has an elastic recovery defined by the above-mentioned formula (1) of from 70 to 100%, preferably from 72 to 100%, more preferably from 74 to 100%, much more preferably from 76 to 100%, very much more preferably 78 to 100%, and particularly preferably from 80 to 100%. When the elastic recovery is less than 70%, a balance among flexibility, scratch resistance, tensile elongation characteristics, resistance to whitening on bending and stability of surface properties of the thermoplastic resin composition in accordance with the present invention is not good, and particularly scratch resistance and stability of surface properties thereof deteriorate.

The elastic recovery means a ratio of a stress-residual deformation recovery to a stretch deformation, which are obtained from a 100% strain hysteresis curve. Regarding the hysteresis curve, a test piece is gradually stretched under a load to a predetermined length to obtain a curve 1 showing a relationship between a load (transverse axis) and an elongation (longitudinal axis); successively, the load is reduced to shrink the test piece to obtain another curve 2 different from the curve 1; and the curve 1 and the curve 2 are referred to as a hysteresis curve, wherein, in the curve 2, the elongation (longitudinal axis) is not 0(zero) even when the load (transverse axis) is 0(zero). A measuring method of the elastic recovery is as described hereinafter.

Whether or not a certain olefin polymer can meet the olefin polymer in accordance with the present invention is determined according to a method comprising the following steps (1) to (6):

(1) a mixture of 70 parts by weight of the olefin polymer, 30 parts by weight of one polypropylene resin selected from the group consisting of the above-mentioned polymers (A) to (B), 0.20 part by weight of an antioxidant such as IRGANOX 1010, which is a trademark and manufactured by Ciba Specialty Chemicals, Co., and 0.20 part by weight of an antioxidant such as IRGAFOS 168, which is a trademark and manufactured by Ciba Specialty Chemicals, Co., is kneaded at 200° C. for 5 minutes with a batch type closed kneader (for example, a kneader, a trade mark of PLASTI-CORDER PLV 151, manufactured by Brabender OHG) under a rotating speed of 10 rpm, and thereafter additionally kneaded for 5 minutes under 100 rpm to obtain a resin composition (said resin composition is referred to as a "resin composition for evaluation use" hereinafter), (2) the resin composition for evaluation use is press-molded at 230° C. according to JIS K6758 to obtain a sheet having a thickness of 0.5 mm, (3) from the sheet, a dumbbell shaped No. 1 test piece (gauge length=40 mm) is prepared according to JIS K6251, (4) the test pierce is measured with a testing machine, a trade mark of STROGRAPH R, manufactured by Toyo Seiki Seisakusyo, Ltd., according to the following steps (i) to (iv), (i) the test piece is stretched at a cross head speed of 200 mm/min. until a stretch deformation reaches 100% (gauge length 80 mm), (ii) immediately after said stretching, the cross head is reversed, and the test piece is allowed to shrink at a cross head speed of 200 mm/min. until the stress reaches 0(zero), to obtain a chart, (iii) from the chart, the measures corresponding to the stretch deformation and the stress-residual deformation recovery are read, respectively, and (iv) the same steps as the above steps (i) to (iii) are repeated with respect to additional two test pieces, and an arithmetical mean of the three values obtained is regarded as a result of the measurement, (5) the obtained stress-residual deformation recovery and stretch deformation are substituted for the right side of the above formula (1) to obtain the elastic recovery, and (6) when the resulting elastic recovery is within the limitation of from 70 to 100%, the olefin polymer used meets the olefin polymer in accordance with the present invention; and when it is beyond said limitation, the olefin polymer used does not meet the olefin polymer in accordance with the present invention.

Among olefin polymers in accordance with the present invention, preferable is such a polymer as a difference of haze value (ΔHAZE (23)) of the thermoplastic resin composition for evaluation use is preferably not more than 40, more preferably not more than 35, much more preferably not more than 30, very much more preferably not more than 25, and particularly preferably not more than 20, from a viewpoint of stability of surface properties of the thermoplastic resin composition in accordance with the present invention.

The above-mentioned "difference of haze value (ΔHAZE (23))" means a difference between a haze value (a) and a haze value (b), namely, "haze value (a)-haze value (b)", wherein the haze value (a) is measured by a method comprising the following steps (1) to (3):

(1) press-molding the thermoplastic resin composition for evaluation use according to JIS K6758 to obtain sheets having a thickness of 1 mm, (2) hanging the sheets in an air oven (30° C.) for 100 hours according to "Item 6.3 : Air Oven Aging Test" prescribed in JIS K6301, wherein the sheets are prohibited to contact with one another and touch to the wall of the air oven, and (3) measuring a haze value of the aged sheet according to JIS K7105; and the haze value (b) is measured by a method comprising the following steps (1) to (3):

(1) press-molding the thermoplastic resin composition for evaluation use according to JIS K6758 to obtain a sheet having a thickness of 1 mm, (2) leaving the sheet at room temperature for less than two hours, and (3) measuring a haze value of the sheet according to JIS K7105.

Among olefin polymers in accordance with the present invention, preferable is such a polymer as a difference of haze value (ΔHAZE (60)) of the thermoplastic resin composition for evaluation use is preferably not more than 40, more preferably not more than 35, much more preferably not more than 30, very much more preferably not more than 25, and particularly preferably not more than 20, from a viewpoint of stability of surface properties of the thermoplastic resin composition in accordance with the present invention.

The above-mentioned "difference of haze value (ΔHAZE (60))" means a difference between a haze value (a') and a haze value (b'), namely, "haze value (a')-haze value (b')", wherein the haze values (a') and (b') are measured by the same method as that mentioned above except that the temperature of air atmosphere is changed to 60° C.

Among olefin polymers in accordance with the present invention, preferable is such a polymer as a haze value (HAZE) of the thermoplastic resin composition for evaluation use is preferably not more than 75, more preferably not more than 70, much more preferably not more than 65, and very much more preferably not more than 60, from a viewpoint of flexibility, transparency, resistance to whitening on bending and scratch resistance of the thermoplastic resin composition in accordance with the present invention. A measuring method of the haze value (HAZE) is described hereinafter.

Among olefin polymers in accordance with the present invention, preferable is such a polymer as a flexural modulus (Ua) (MPa) measured according to JIS K7203 of the thermoplastic resin composition for evaluation use satisfies preferably the following formula (2), more preferably the following formula (3), much more preferably the following formula (4), and very much more preferably the following formula (5), from a viewpoint of flexibility, scratch resistance, tensile elongation characteristics and resistance to whitening on bending of the thermoplastic resin composition in accordance with the present invention.

$$Ua \leq 1.5 \times Sa \times (Ta/100)^{3.3} \quad (2)$$

$$Ua \leq 1.4 \times Sa \times (Ta/100)^{3.3} \quad (3)$$

$$Ua \leq 1.3 \times Sa \times (Ta/100)^{3.3} \quad (4)$$

$$Ua \leq 1.2 \times Sa \times (Ta/100)^{3.3} \quad (5)$$

In the above formulas (2) to (5), "Sa" means a flexural modulus (MPa) measured according to JIS K7203 of a polypropylene resin used for the thermoplastic resin composition for evaluation use, and "Ta" means a content (% by weight) of the polypropylene resin in the thermoplastic resin composition for evaluation use.

Among olefin polymers in accordance with the present invention, preferable is such a polymer as a heat distortion temperature (J(° C.)) of the thermoplastic resin composition for evaluation use satisfies preferably the following formula (6), more preferably the following formula (7), much more preferably the following formula (8), and very much more preferably the following formula (9), from a viewpoint of flexibility, scratch resistance, tensile elongation characteristics, and resistance to whitening on bending of the thermoplastic resin composition in accordance with the present invention.

$$J \geq K-50 \quad (6)$$

$$J \geq K-40 \quad (7)$$

$$J \geq K-30 \quad (8)$$

$$J \geq K-20 \quad (9)$$

In the above formulas (6) to (9), "K" means a heat distortion temperature (° C.) of the thermoplastic resin composition for evaluation use.

The above-mentioned heat distortion temperature is measured according to a process, which comprises the following steps (1) to (7), and which conforms to the Tokyo Metropolitan Ordinance No. 1027 except that a thickness of a sheet is changed to 0.5 mm:

(1) fixing a sheet (140 mm of length, 30 mm of width and 0.5 mm of thickness) comprising the thermoplastic resin composition for evaluation use with a fastener in a portion of 30 mm width and 25 mm length from the upper end thereof in a longitudinal direction, (2) further fixing the sheet with another fastener in a portion of 30 mm width and 25 mm length from the lower end thereof in a longitudinal direction, to which another fastener a load of 10 g is applied, (3) hanging the fixed sheet in an oven, whose temperature is kept constant, (4) heating the sheet for 1 hour, (5) examining the presence or absence of stretching and cutting in a portion of the sheet (140 mm length–25 mm length–25 mm length=90 mm length, and 30 mm width), which portion is freed from the fasteners, (6) raising the oven temperature by 5° C. to repeat the above-mentioned steps (1) to (5), when neither stretching nor cutting is observed on the sheet, and (7) regarding a maximum oven temperature as a heat distortion temperature of the sheet, at which maximum oven temperature neither stretching nor cutting is observed on the sheet.

Among olefin polymers in accordance with the present invention, preferable is such a polymer as an elongation at break (%) measured according to JIS K 6251 of the thermoplastic resin composition for evaluation use satisfies preferably the following formula (10), more preferably the following formula (11), much more preferably the following formula (12), and very much more preferably the following formula (13), from a viewpoint of viewpoint of flexibility, scratch resistance, tensile elongation characteristics and resistance to whitening on bending of the thermoplastic resin composition in accordance with the present invention. The elongation at break is measured at a tensile speed of 200 mm/min. using a dumbbell shaped No. 3 test piece.

$$EB①≥EB②-30 \qquad (10)$$

$$EB①≥EB②-20 \qquad (11)$$

$$EB①≥EB②-10 \qquad (12)$$

$$EB①≥EB② \qquad (13)$$

In the above formulas, EB① means an elongation at break (%) of a thermoplastic resin composition comprising 30% by weight of the polypropylene resin and 70% by weight of the olefin polymer, and EB② means an elongation at break (%) of a thermoplastic resin composition comprising 70% by weight of the polypropylene resin and 30% by weight of the olefin polymer.

Among the olefin polymers in accordance with the present invention, preferable is such a polymer as crystallization temperature (Tc) (° C.) measured according to JIS K7122 with a differential scanning calorimeter (DSC) of the thermoplastic resin composition for evaluation use satisfies the following formula (14). In the following formula (14), TCPP means a crystallization temperature measured according to the same method as mentioned above of the polypropylene resin contained in the thermoplastic resin composition for evaluation use.

$$Tc≤TcPP \qquad (14)$$

A fact that the thermoplastic resin composition in accordance with the present invention is superior in its flexibility, tensile elongation characteristics and resistance to whitening on bending can be identified by a spin-spin relaxation time (hereinafter ref erred to as "T2 relaxation time") obtained from a pulse NMR of said thermoplastic resin composition. That is, a T2 relaxation time of the thermoplastic resin composition superior in the above-mentioned various physical properties is close to an average T2 relaxation time obtained from a T2 relaxation time of the olefin polymer, that of the thermoplastic resin as specifically described below and a blending proportion of the olefin polymer and the thermoplastic resin in the thermoplastic resin composition. On the other hand, the difference between the T2 relaxation time of the thermoplastic resin composition and the average T2 relaxation time is increased with deterioration in the above-mentioned physical properties of the thermoplastic resin composition.

An intrinsic viscosity [η] of the olefin polymer in accordance with the present invention is preferably from 0.3 to 10.0, more preferably from 0.5 to 7.0, and much more preferably from 0.7 to 5.0 from a viewpoint of stability of surface properties, scratch resistance, flexibility, tensile elongation characteristics and resistance to whitening on bending of the thermoplastic resin composition in accordance with the present invention. The intrinsic viscosity [η] is measured according to a method as described hereinafter.

A molecular weight distribution (Mw/Mn) of the olefin polymer in accordance with the present invention is preferably not more than 5, more preferably not more than 4, and much more preferably not more than 3 from a viewpoint of elapsing stability of surface properties and flexibility of the thermoplastic resin composition in accordance with the present invention. The molecular weight distribution is measured according to a method described hereinafter.

Among olefin polymers in accordance with the present invention, preferable is an olefin polymer having neither a peak of not less than 1 J/g in a crystal melting nor a peak of not less than 1 J/g in crystallization measured according to a differential scanning calorimetry conformed to JIS K7122, from a viewpoint of flexibility, tensile elongation characteristics, resistance to whitening on bending and scratch resistance of the thermoplastic resin composition in accordance with the present invention. The differential scanning calorimetry is carried out as described hereinater.

A tensile strength at break measured according to JIS K6251 of the olefin polymer in accordance with the present invention is preferably less than 2.0 MPa, more preferably less than 1.8 MPa, much more preferably less than 1.6 MPa, very much more preferably less than 1.4 MPa, particularly preferably less than 1.2 MPa, more particularly preferably less than 1.0 MPa, and furthermore particularly less than 0.8 MPa. The tensile strength at break is measured according to JIS K6251, from a viewpoint of flexibility, tensile elongation characteristics, resistance to whitening on bending and scratch resistance of the thermoplastic resin composition in accordance with the present invention.

The olefin polymer in accordance with the present invention can be used as a component for the production of a thermoplastic resin composition comprising said olefin polymer and a thermoplastic resin as specifically described hereinafter. Further, the olefin polymer can be blended with or laminated to a material having an insufficient damping property to improve the damping property thereof.

Furthermore, the olefin polymer in accordance with the present invention can be used as a component for improving flexibility of a thermoplastic elastomer. A resin constituting the thermoplastic elastomer contains, for example, polyethylene resins, polypropylene resins, polybutene resins, polymethylpentene resins, polystyrene resins, copolymer resins of ethylene and an acrylic acid monomer, copolymer resins of ethylene and a vinyl acetate monomer, copolymer resins of ethylene and a methacrylic acid monomer, acrylic resins, polyester resins, polycarbonate resins, nylon resins and polyvinyl alcohol resins. Rubber constituting the thermoplastic elastomer contains, for example, ethylene/α-olefin copolymer rubber, ethylene/α-olefin/polyene copolymer rubber, styrene rubber, hydrogenated styrene rubber and diene rubber. The rubber in the thermoplastic elastomer may be unvulcanized or partially vulcanized or entirely vulcanized. If desired, the thermoplastic elastomer may contain oil; inorganic fillers such as calcium carbonate; and additives such as flame retarders, lubricants, antistatic agents, heat resistant stabilizers, antioxidants, mold lubricants and pigments.

The olefin polymer in accordance with the present invention can be produced using a polymerization catalyst such as a Ziegler Natta catalyst and a single site catalyst (including metallocene). The polymerization catalyst is preferably a single site catalyst such as a metallocene catalyst from a viewpoint of a uniform composition distribution of the olefin polymer obtained.

Examples of the single site catalyst are metallocene catalysts as disclosed in, for example, JP-A 58-19309, JP-A 60-35005, JP-A 60-35006, JP-A 60-35007, JP-A 60-35008, JP-A 61-130314, JP-A 3-163088, JP-A 4-268307, JP-A 9-12790, JP-A 9-87313, JP-A 11-193309, JP-A 11-80233 and JP-W 10-508055, and non-metallocene complex catalysts as disclosed in, for example, JP-A 10-316710, JP-A 11-100394, JP-A 11-80228, JP-A 11-80227, JP-W 10-513489, JP-A 10-338706 and JP-W 11-71420. Among these, metallocene catalysts are generally used.

From a viewpoint of flexibility of the olefin polymer obtained, a preferred metallocene catalyst is a transition metal complex, whose metal belongs to any of the groups 3 to 12 of the periodic table of the elements, and which has at least one cyclopentadiene anionic skeleton and a $C_1$ symmetric structure.

A preferable process for producing a high molecular weight olefin polymer using the metallocene catalyst is disclosed in JP-A 11-80233, according to which at least one compound selected from the group consisting of ethylene, α-olefins having 3 to 20 carbon atoms, polyene compounds, cyclic olefins and vinyl aromatic compounds is polymerized in the presence of a catalyst obtained using at least one transition metal complex (α) described below, and at least one aluminum compound (β) described below and/or a boron compound (γ) described below.

Transition Metal Complex (α)

Transition metal complexes represented by the following formula [I], [II] or [III].

Aluminum Compound (β)

An aluminum compound expressed by the following (β1), (β2) or (β3).

(β1): An organoaluminum compound represented by a formula, $E^1_a AlZ_{3-a}$.

(β2): A cyclic aluminoxane having a structure represented by a formula, $\{-Al(E^2)-O-\}_b$.

(β3): A linear aluminoxane having a structure represented by a formula, $\{-Al(E^3)-O-\}_c AlE^3_2$.

In the above, $E^1$, $E^2$ and $E^3$ are each a hydrocarbon group, all $E^1$, all $E^2$ and all. $E^3$ are the same or different, Z is a hydrogen atom or a halogen atom, and all Z are the same or different, a is a number satisfying $0<a\leq3$, b is an integer of not less than 2, and c is an integer of not less than 1.

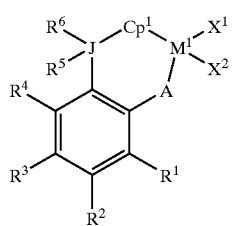

[I]

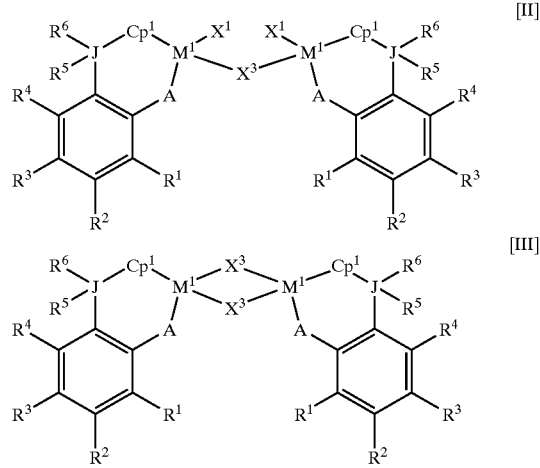

In the above formulae [I] to [III], $M^1$ is a transition metal atom belonging to the group 4 of the periodic table, A is an atom belonging to the group 16 of he periodic table, J is an atom belonging to the group 14 of the periodic table, $Cp^1$ is a group having a cyclopentadiene type anion skeleton, $X^1$, $X^2$, $R^1$, $R^2$, $R^3$, $R^4$, $R^5$ and $R^6$ are independently of one another a hydrogen atom, a halogen atom, an alkyl group, an aralkyl group, an aryl group, a substituted silyl group, an alkoxy group, an aralkyloxy group, an aryloxy group or a di-substituted amino group, and $X^3$ is an atom belonging to the group 16 of the periodic table, provided that $R^1$, $R^2$, $R^3$, $R^4$, $R^5$ and $R^6$ may be optionally combined to form a ring, and two of $M^1$, A, J, $Cp^1$, $X^1$, $X^2$, $R^1$, $R^2$, $R^3$, $R^4$, $R^5$ and $R^6$ are the same or different.

Boron Compound (γ)

Boron compounds expressed by the following (γ1), (γ2) or (γ3).

(γ1): A boron compound represented by a formula, $BQ^1Q^2Q^3$.

(γ2): A boron compound represented by a formula, $G^+(BQ^1Q^2Q^3Q^4)^-$.

(γ3): A boron compound represented by a formula, $(L-H)^+(BQ^1Q^2Q^3Q^4)^-$.

In the above, B is a trivalent boron atom, $Q^1$ to $Q^4$ are each a halogen atom, a hydrocarbon group, a halogenated hydrocarbon group, a substituted silyl group, an alkoxy group or a di-substituted amino group and are the same or different, $G^+$ is an inorganic or organic cation, L is a neutral Lewis base, and $(L-H)^+$ is a Brønsted acid.

In the case where a catalyst obtained from a combination of the component (α) and the component (β) among the components (α) to (γ) is used, it is recommendable to use the component (β2) and/or the component (β3) as the component (β). In the case where a catalyst obtained from a combination of the component (α), the component (β) and the component (γ) is used, it is recommendable to use at least one component selected from the above-mentioned components (β1) to (β33) as the component (β).

With respect to amounts to be used of the components (α) to (γ), a ratio of the component (β)/the component (α) is usually from 0.1 to 10,000, preferably from 5 to 2,000 in terms of a molar ratio, and a ratio of the component (γ)/the component (α) is usually from 0.01 to 100, preferably from 0.5 to 10 in terms of a molar ratio.

When the components (α) to (γ) are used in the form of a solution or a suspension, it is permitted to suitably select its concentration depending upon conditions such as performance of an apparatus used for supplying respective components to a polymerization reactor. A concentration of the component (α) is usually from 0.01 to 500 μmol/g, preferably from 0.05 to 100 μmol/g, more preferably from 0.05 to 50 μmol/g. A concentration of the component (β) in terms of Al atom is usually from 0.01 to 10,000 μmol/g, preferably from 0.1 to 5,000 μmol/g, more preferably from 0.1 to 2,000 μmol/g. A concentration of the component (γ) is usually from 0.01 to 500 μmol/g, preferably from 0.05 to 200 μmol/g, more preferably from 0.05 to 100 μmol/g.

A polymerization process for obtaining the olefin polymer is not limited. As the polymerization process, a solution process and slurry process wherein a solvent is used, and a gas phase process wherein no solvent is used are exemplified. Examples of the solvent are aliphatic hydrocarbons such as butane, pentane, hexane, heptane and octane; aromatic hydrocarbons such as benzene and toluene; and halogenated hydrocarbons such as methylene dichloride. It is possible to carry out the polymerization in any of continuous or batch manner. A polymerization temperature is usually from −50 to 200° C., particularly preferably from −20 to 100° C. A polymerization pressure is preferably from atmospheric pressure to 60 kg/cm²G. A polymerization time can be suitably determined depending upon the catalyst to be used and a reaction apparatus, and is usually from 1 minute to 20 hours. It is permitted to use a chain transfer agent such as hydrogen to regulate a molecular weight of the olefin polymer to be obtained.

The thermoplastic resin composition in accordance with the present invention comprises the above-mentioned olefin polymer in an amount of from 99 to 1% by weight, preferably from 95 to 5% by weight, more preferably from 90 to 10% by weight, much more preferably from 85 to 15% by weight, and particularly preferably from 80 to 20% by weight, and a below-mentioned thermoplastic resin in an amount of from 1 to 99% by weight, preferably from 5 to 95% by weight, more preferably from 10 to 90% by weight, much more preferably from 15 to 85% by weight, and particularly preferably from 20 to 80% by weight.

The above-mentioned thermoplastic resin is not limited. Examples of the thermoplastic resin are polyethylene resins such as high density polyethylene, medium density polyethylene, low density polyethylene and linear low density polyethylene (LLDPE), polypropylene resins, polybutene resins, poly-4-methyl-pentene-1 resins, polystyrene resins, polyester resins, polyamide resins, polyphenylene ether resins, polyphenylene oxide resins, polyacetal resins and polycarbonate resins.

Among the above-mentioned resins, preferred are polyolefin resins such as polyethylene resins, polypropylene resins, polybutene resins and poly-4-methyl-pentene-1 resins. More preferred are polyolefin resins having a polymerization unit of an aliphatic olefin having 2 or more carbon atoms (hereinafter called like "aliphatic olefin unit of 2 or more carbon atoms") as a main unit. Much more preferred are polyolefin resins having an aliphatic olefin unit of 3 or more carbon atoms as a main unit. Polypropylene resins are particularly preferred.

Examples of the polypropylene resins are propylene homopolymers and random and block copolymers of propylene and other olefins (obtainable by multi-stage polymerization), which are crystalline and mainly have an isotactic sequence structure or a syndiotactic sequence structure. The polypropylene resins can be produced according to a gas phase polymerization, a bulk polymerization, a solvent polymerization or a multi-stage polymerization comprising a combination of these polymerization. A number average molecular weight of the polypropylene resins is not limited. A preferred number average molecular weight thereof is from 10,000 to 1,000,000.

A melting point of the above-mentioned polypropylene resin, which melting point is an index of crystallinity, is preferably from 80 to 176° C., and more preferably from 120 to 176° C., from a viewpoint of heat resistance of the thermoplastic resin composition in accordance with the present invention. A crystal melting calorie thereof is preferably from 30 to 120 J/g, and more preferably from 60 to 120 J/g from the same viewpoint, The above-mentioned polypropylene resin can be usually produced according to a conventional process, which comprises a step of polymerizing propylene alone in the presence of a catalyst to obtain a homopolymer, or polymerizing a combination of propylene and at least one olefin selected from the group consisting of olefins having 2 to 12 carbon atoms (excluding propylene) in the presence of a catalyst to obtain a copolymer. Examples of the catalyst are (i) a Ziegler Natta catalyst comprising a titanium-containing solid transition metal component and an organometal component, or (ii) a metallocene catalyst, which comprises a transition metal compound having at least one cyclopentadienyl skeleton and a co-catalyst component, wherein the transition metal belongs to the groups 4 to 6 of the periodic table of the elements. The homopolymerization and copolymerization can be carried out according to a slurry polymerization, a gas phase polymerization, a bulk polymerization, a solution polymerization or a polymerization comprising a combination thereof in a one stage manner or a multi-stage manner. It is permitted to use a commercially available polypropylene resin.

From a viewpoint of flexibility, scratch resistance, resistance to whitening on bending and transparency of the thermoplastic resin composition in accordance with the present invention, a preferable thermoplastic resin is a polypropylene resin having preferably 15 to 205 carbon atoms, more preferably 25 to 155 carbon atoms, and much more preferably 35 to 105 carbon atoms per 1000 carbon atoms constituting a main chain thereof, wherein the carbon atom means a methylene carbon atom of two or more chains. The polypropylene resin having from 15 to 205 carbon atoms as the methylene carbon atom of two or more chains can be produced, for example, according to a process comprising the step of copolymerizing ethylene and propylene, or a process comprising the step of producing a tail-to-tail bond of propylene. A content of the methylene carbon atom of two or more chains can be found according to a method such as a $^{13}$C-NMR method and an IR method (refer to, for example, Shinpan Koubunshi Bunseki Hand Book I, 2.3 (1995)) issued by Kinokuniya shoten.

Among the thermoplastic resins, from a viewpoint of impact resistance and resistance to whitening on bending of the thermoplastic resin composition in accordance with the present invention, preferable is a copolymer obtained by copolymerizing ethylene and propylene according to a multi-step polymerization process such as a two-step polymerization process comprising the steps of:

(1) polymerizing propylene alone to obtain a propylene homopolymer, or copolymerizing ethylene and propylene to obtain an ethylene-propylene copolymer having an ethylene content of not more than 5.0% by weight, hereinafter said homopolymer and said copolymer being referred to as "copolymer-1", and (2) further copolymerizing ethylene and propylene in the presence of the copolymer-1 obtained in the above step (1) to produce an ethylene-propylene copolymer (hereinafter referred to as "copolymer-2") having an ethylene content of from 7 to 85% by weight, thereby obtaining an object copolymer.

The above-mentioned object copolymer is commercially available, and such a copolymer is referred to as "block polypropylene" or "high impact polypropylene". The above-mentioned steps (1) and (2) are carried out, so that a weight ratio between the copolymer-1 and the copolymer-2 (namely, copolymer-1/copolymer-2) in said object copolymer is from 30/70 to 90/10. When the ethylene content in the copolymer-1 exceeds 5.0% by weight, the thermoplastic resin composition obtained may deteriorate in its heat resistance. When the ethylene content in the copolymer-2 is less than 7% by weight, the thermoplastic resin composition obtained may deteriorate in its resistance to whitening on bending. When the ethylene content in the copolymer-2 exceeds 85% by weight, the thermoplastic resin composition obtained may deteriorate in its impact resistance. When the weight ratio of copolymer-1/copolymer-2 is less than 30/70, the thermoplastic resin composition obtained may be insufficient in its; resistance to whitening on bending. When the ratio exceeds 90/10, the thermoplastic resin composition obtained may not be sufficient in its impact resistance. Ethylene and propylene used in the step (1) or (2) maybe used in combination with a different $\alpha$-olefin such as butene-1, hexene-1 and octene-1, respectively. A content of said $\alpha$-olefin unit in the copolymer-1 or copolymer-2 is from about 1 to 5% by weight, provided that the sum of the ethylene unit, the propylene unit and the $\alpha$-olefin unit in the copolymer-1 or copolymer-2 is 100% by weight.

Among the thermoplastic resins, from a viewpoint of tensile elongation, flexibility, transparency, processability and heat resistance of the thermoplastic resin composition in accordance with the present invention, preferable is a non-rigid olefin copolymer resin having a JIS A hardness measured according to JIS K6301 of from 70 to 97, and preferably from 75 to 97, and a flexural modulus measured according to JIS K7203 of from 50 to 500 MPa, and preferably from 55 to 450 MPa.

A monomer unit in the above-mentioned non-rigid olefin copolymer resin is not limited. Examples of the monomer unit are an $\alpha$-olefin unit (essential unit) and other olefin units different therefrom. An example of a preferable non-rigid olefin copolymer resin is a resin comprising an ethylene unit of from 1 to 85 mol % and a propylene unit of from 99 to 15 mol %. Besides the ethylene unit and propylene unit, the non-rigid olefin copolymer resin may comprise a unit derived from an olefin such as 1-butene, 4-methyl-1-pentene, 1-hexene and 3-methyl-1-butene, and a unit derived from a non-conjugated diene such as 1,4-hexadiene, dicyclopentadiene, 5-ethylidene-2-norbornene and 7-methyl-1,6-octadiene in an amount of not more than 5 mol %, provided that the sum of the ethylene unit, the propylene unit, the olefin unit and the non-conjugated diene content is 100 mol %.

The above-mentioned non-rigid olefin copolymer resin may further comprises a monomer unit having a functional group in addition to the monomer units mentioned above. Examples of the functional group are a hydroxyl group, a carboxyl group, an acid anhydride group, an amino group, an isocyanate group, an epoxy group and an ester group. Examples of the monomer having the functional group are (meth)acrylic acid, hydroxyacrylates, (anhydrous) maleic acid and glycidyl (meth)acrylate. The non-rigid olefin copolymer resin comprising the functional group-having monomer unit, for example, a resin comprising the functional group-having monomer unit, the ethylene unit and the propylene unit, can be obtained according to a process such as (1) a process comprising the step of copolymerizing a functional group-having monomer, ethylene and propylene, and (2) a process comprising the step of modifying a resin containing the ethylene unit and the propylene unit with a functional group-having monomer to introduce the functional group to the resin.

The above-mentioned non-rigid olefin copolymer resin may be a random copolymer or a block copolymer obtained by multi-stage polymerization. Examples of a polymerization process for producing said resin are a gas phase polymerization, a bulk polymerization, a solvent polymerization and a multi-stage polymerization comprising an optional combination thereof. A number average molecular weight of said resin is not limited, and preferably from 10,000 to 1,000,000. Said resin may be a commercially available one.

From a viewpoint of tensile elongation, flexibility, transparency, processability and heat resistance of the thermoplastic resin composition in accordance with the present invention, the non-rigid olefin copolymer resin may be used in combination with a polyolefin resin having a flexural modulus measured according to JIS K7203 of from 550 to 1800 MPa, and preferably from 600 to 1800 MPa. When the flexural modulus is less than 550 MPa, the thermoplastic resin composition obtained may deteriorate in its heat resistance. When the flexural modulus exceeds 1800 MPa, the thermoplastic resin composition obtained may deteriorate in its flexibility. A preferable amount of said polyolefin resin is from 30/70 to 99/1 in terms of a weight ratio of "total weight of the thermoplastic resin and the non-rigid olefin copolymer resin/weight of the polyolefin resins", from a viewpoint of balance between flexibility and strength of the thermoplastic resin composition obtained.

Among the thermoplastic resins, preferable is a polybutene resin comprising a butene unit from a viewpoint of transparency and flexibility of the thermoplastic resin composition in accordance with the present invention. There are known polybutene resins such as homopolymer resins of butene obtained using a catalyst such as a Ziegler Natta catalyst and a metallocene catalyst, and copolymer resins of butene and at least one monomer different therefrom. Of these, from a viewpoint of heat resistance and strength of the thermoplastic resin composition in accordance with the present invention, preferable is a polybutene resin having a melting point measured with a differential scanning calorimeter (DSC) of preferably from 30 to 130° C., more preferably from 40 to 130° C., and much more preferably from 50 to 130° C. The melting point is measured using a differential scanning calorimeter such as that of a trade mark of DSC220, manufactured by Seiko Instruments Inc., at temperature raising and descending rates of 10° C./min.

The polybutene resin can be produced by copolymerizing 1-butene with ethylene or an $\alpha$-olefin having 3 to 8 carbon atoms. Examples of preferable $\alpha$-olefin are propylene, 1-hexene and 1-octene. A content of an $\alpha$-olefin unit in the polybutene resin is not more than 50% by weight, preferably from 0.5 to 40% by weight, and more preferably from 1 to 30% by weight. The polybutene resin may be a commercially available one.

From a viewpoint of transparency, flexibility, strength and heat resistance of the thermoplastic resin composition in accordance with the present invention, the above-mentioned polybutene resin may be used in combination with the polypropylene resin. With respect to a blending amount in such a case, the amount of the polybutene resin is preferably from 1 to 98% by weight, and more preferably from 5 to 90% by weight, that of the olefin polymer in accordance with the present invention is preferably from 1 to 98% by weight, and more preferably from 5 to 90% by weight, and that of the polypropylene resin is preferably from 1 to 98% by weight, and more preferably from 5 to 90% by weight.

From a viewpoint of transparency and heat resistance of the thermoplastic resin composition in accordance with the present invention, examples of the thermoplastic resin are cyclic olefin resins such as homopolymer resins of cyclic olefins and copolymer resins of a cyclic olefin and other monomers, which resins can be produced using a catalyst such as a conventional Ziegler Natta catalyst and a metallocene catalyst.

Examples of the cyclic olefin are norbornene, 5-methylnorbornene, 5-ethylnorbornene, 5-propylenorbornene, 5,6-dimethylnorbornene, 1-methylnorbornene, 7-methylnorbornene, 5,5,6-trimethylnorbornene, 5-phenylnorbornene, 5-benzylnorbornene, 5-ethylidenenorbornene, 1,4,5,8-dimethano-1,2,3,4,4a,5,8,8a-octahydronaphthalene, 2-methyl-1,4,5,8-dimethano-1,2,3,4,4a,5,8,8a-octahydronaphthalene, 2-ethyl-1,4,5,8-dimethano-1,2,3,4, 4a, 5,8,8a-octahydronaphthalene, 2,3-dimethyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-ethylidene-1,4,5,8-dimethano-1,2, 3,4,4a,5,8,8a-octahydronaphthalene, 2-fluoro-1,4,5,8-dimethano-1,2,3,4,4a, 5,8,8a-octahydronaphthalene, 1,5-dimethyl-1,4,5,8-dimethano-1,2,3,4,4a,5,8,8a-octahydronaphthalene, 2-cyclohexyl-1,4,5,8-dimethano-1,2, 3,4,4a,5,8,8a-octahydronaphthalene, 2,3-dichloro-1,4,5,8-dimethano-1,2,3,4,4a,5,8,8a-octahydronaphthalene, 2-isobutyl-1,4,5,8-dimethano-1,2,3,4,4a,5,8,8a-octahydronaphthalene, 1,2-dihydrodicyclopentadiene, 5-chloronorbornene, 5,5-dichloronorbornene, 5-fluoronorbornene,5,5,6-trifluoro-6-trifluoromethylnorbornene, 5-chloromethylnorbornene, 5-methoxynorbornene, 5,6-dicarboxynorbornene anhydrate, 5-dimethylaminonorbornene, 5-cyanonorbornene, cyclopentene, 3-methylcyclopentene, 4-methylcyclopentene, 3,4-dimethylcyclopentene, 3,5-dimethylcyclopentene, 3-chlorocyclopentene, cyclohexene, 3-methylcyclohexene, 4-methylcyclohexene, 3,4-dimethylcyclohexene, 3-chlorocyclohexene and cycloheptene.

The cyclic olefin resin can be produced by copolymerizing the cyclic olefin with ethylene or an α-olefin having 3 to 8 carbon atoms. Examples of preferable α-olefins are propylene, 1-butene, 1-hexene and 1-octene. A content of an α-olefin unit in the cyclic olefin resin is not more than 50% by weight, preferably from 0.5 to 40% by weight, and more preferably from 1 to 30% by weight, provided that the sum of the cyclic olefin unit and the α-olefin unit is 100% by weight.

The thermoplstic resin composition in accordance with the present invention comprises the olefin polymer in accordance with the present invention in an amount of from 99 to 1% by weight, preferably from 95 to 10% by weight, more preferably from 90 to 20% by weight, much more preferably from 85 to 30% by weight, and particularly preferably from 80 to 40% by weight, and the thermoplastic resin in an amount of from 1 to 99% by weight, preferably from 5 to 90% by weight, more preferably from 10 to 80% by weight, much more preferably from 15 to 70% by weight, and particularly preferably from 20 to 60% by weight, provided that the sum of the olefin resin and the thermoplstic resin is 100% by weight. When the amount of the olefin polymer exceeds 99% by weight, the thermoplastic resin composition obtained deteriorates in its flexibility. When the amount of the olefin polymer is less than 1% by weight, the thermoplastic resin composition obtained is insufficient in its strength.

Each of the above-mentioned olefin polymer and thermoplastic resin may be used in combination with at least one kind of a component selected from the group consisting of the following (1) to (3):

(1) block copolymers comprising a polymer block having a vinyl aromatic compound unit as a main unit, and a polymer block having a conjugated diene compound unit as a main unit, (2) block copolymers obtained by hydrogenating the above-mentioned block copolymers (1), and (3) ethylene polymers having a tensile strength measured according to JIS K6251 of not less than 2.0 MPa.

The polymer block having a vinyl aromatic compound unit as a main unit described in the above item (1) may comprise a unit such as a conjugated diene compound unit in a small proportion A content of the vinyl aromatic compound unit in the polymer block is preferably from 60 to 99% by weight. When the content is less than 60% by weight, the thermoplastic resin composition obtained may deteriorate in its mechanical strength. When the content exceeds 99% by weight, the thermoplastic resin composition obtained may deteriorate in its flexibility. The block copolymer described in the above item (1) may be a commercially available one.

Examples of the vinyl aromatic compound are styrene, α-methylstyrene, p-methylstyrene, vinylxylene, monochlorostyrene, dichlorostyrene, monobromostyrene, dibromostyrene, fluorostyrene, p-tert-butylstyrene, ethylstyrene and vinylnaphthalene. Two or more thereof may be used at the same time. Of these, particularly preferred is styrene.

The polymer block having a conjugated diene compound unit as a main unit described in the above item (1) may comprise a unit such as a vinyl aromatic compound unit in a small proportion. Examples of the conjugated diene compound are 1,3-butadiene, isoprene, 2,3-dimethyl-1,3-butadiene, 2-neopentyl-1,3-butadiene, 2-chloro-1,3-butadiene, 2-cyano-1,3-butadiene, substituted linear conjugated pentadienes, linear conjugated hexadienes and side chain-conjugated hexadienes. Two or more thereof may be used at the same time. Of these, particularly preferred are 1,3-butadiene and isoprene. A content of the conjugated diene compound unit in the polymer block is preferably from 60 to 99% by weight based on 100% by weight of the polymer block. When the content is less than 60% by weight, the thermoplastic resin composition obtained may deteriorate in its flexibility. When said content exceeds 99% by weight, the thermoplastic resin composition obtained may deteriorate in its mechanical strength.

As the block copolymer described in the above item (1), block copolymers represented by the following formulas (15) to (17) can be exemplified.

   (15)

   (16)

   (17)

In the above formulas, cH means the polymer block having the vinyl aromatic compound unit as a main unit, cS means the polymer block having the conjugated diene compound unit as a main unit, X means a residual group of a coupling agent, and n means an integer of not less than 1.

A content ratio between the polymer block having the vinyl aromatic compound unit as a main unit and the polymer block having the conjugated diene compound unit as a main unit in the above-mentioned block copolymer (1) is preferably from 2/98 to 50/50. When the content ratio is less than 2/98, the thermoplastic resin composition obtained may deteriorate in its elasticity. When the content ratio exceeds 50/50, the thermoplastic resin composition obtained may deteriorate in its flexibility.

The block copolymers represented by the formulas (15) and (16) can be generally produced, for example, by a process comprising alternately repeating a step-1 of producing the polymer block cH or the polymer block cS and a step-2 of producing the polymer block cS or the polymer block cH in an organic solvent using a catalyst such as an organic lithium compound. Here, it doesn't matter which the polymer block cH or the polymer block cS is produced in advance. Incidentally, it is able to obtain a block copolymer of cH-cS-cH, when the process comprises three steps of step-1→step-2→step-1.

The block copolymer represented by the formula (15) can be reacted with a coupling agent to produce the block copolymer represented by the formula (17). Examples of the coupling agent are diethyl adipate, divinylbenzene, tetrachlorosilane, butyltrichlorosilane, tin tetrachloride, tin butyltrichloride, dimethyldichlorosilane, germanium tetrachloride, 1,2-dibromoethane, 1,4-chloromethylbenzene, bis(trichlorosilyl)ethane, epoxidized linseed oil, tolylenediisocyanate and 1,2,4-benzenetriisocyanate.

The block copolymer described in the above item (2) can be produced, for example, by a process comprising the steps of dissolving the block copolymer described in the above item (1) in an inert solvent, and hydrogenating said block copolymer with hydrogen having pressure of from 1 to 100 kg/cm$^2$ at 20 to 150° C. in the presence of a hydrogenation catalyst. A hydrogenation degree of the conjugated diene unit in the block copolymer (1) can be controlled by varying conditions such as a hydrogenation catalyst, an amount of hydrogen, pressure of hydrogen and reaction time. The block copolymer described in the above item (2) may be a commercially available one.

From a viewpoint of flexibility and mechanical strength of the thermoplastic resin composition in accordance with the present invention, preferable is a thermoplastic resin composition comprising (i) the thermoplastic resin in an amount of from 1 to 98% by weight, and preferably from 5 to 90% by weight, (ii) the olefin polymer in accordance with the present invention in an amount of from 1 to 98% by weight, and preferably from 5 to 90% by weight, and (iii) the block copolymer described in the above item (1) and/or the block copolymer described in the above item (2) in an amount of from 1 to 98% by weight, and preferably from 5 to 90% by weight.

Examples of the ethylene polymer described in the above item (3) are polyethylene such as low density polyethylene, linear low density polyethylene, ultra low density polyethylene, medium density polyethylene and high density polyethylene; and copolymers of ethylene and at least one compound selected from the group consisting of the following compounds (1) to (6):

(1) α-Olefins such as propylene, 1-butene, 4-methyl-1-pentene, 1-hexene, 1-heptene and 1-octene, (2) non-conjugated dienes such as 1,4-hexadiene, dicyclopentadiene and 5-ethylidene-2-norbornene, (3) monocarboxylic acids such as acrylic acid, methacrylic acid, ethacrylic acid and crotonic acid, (4) dicarboxylic acids such as maleic acid, fumaric acid, itaconic acid and citraconic acid, and their monoesters, (5) acrylic acid esters and methacrylic acid esters such as methyl methacrylate, methyl acrylate and ethyl acrylate, and (6) vinyl esters of saturated carboxylic acids such as vinyl acetate and vinyl propionate, and their ionomers.

The ethylene polymer described in the above item (3) may be a combination of two or more polymers. Preferred is an ethylene polymer having an ethylene unit content of not less than 80 mol %.

From a viewpoint of low temperature resistance, flexibility and mechanical strength of the thermoplastic resin composition in accordance with the present invention, preferable is a thermoplastic resin composition comprising (i) the thermoplastic resin in an amount of from 1 to 98% by weight, and preferably from 5 to 90% by weight, (ii) the olefin polymer in accordance with the present invention in an amount of from 1 to 98% by weight, and preferably from 5 to 90% by weight, and (iii) the ethylene polymer described in the above item (3) in an amount of from 1 to 98% by weight, and preferably from 5 to 90% by weight.

From a viewpoint of flexibility, mechanical strength and low temperature resistance of the thermoplastic resin composition in accordance with the present invention, preferable is a thermoplastic resin composition comprising (i) the thermoplastic resin in an amount of from 1 to 97% by weight, and preferably from 5 to 85% by weight, (ii) the olefin polymer in accordance with the present invention in an amount of from 1 to 97% by weight, and preferably from 5 to 85% by weight, (iii) the block copolymer described in the above item (1) and/or the block copolymer described in the above item (2) in an amount of from 1 to 97% by weight, and preferably from 5 to 85% by weight, and (iv) the ethylene polymer described in the above item (3) in an amount of from 1 to 97% by weight, and preferably from 5 to 85% by weight.

If desired, each of the thermoplastic resin and the olefin polymer used for producing the thermoplastic resin composition in accordance with the present invention may be used in combination with a suitable amount of other rubber. Examples of the rubber are natural rubber, polybutadiene, liquefied polybutadiene, polyacrylonitrile rubber, acrylonitrile-butadiene copolymer rubber, partially hydrogenated acrylonitrile-butadiene copolymer rubber, butyl rubber, chloroprene rubber, fluororubber, chlorosulfonated polyethylene, silicone rubber, urethane rubber, isobutylene-isoprene copolymer rubber and halogenated isobutylene-isoprene rubber.

The thermoplastic resin composition in accordance with the present invention may be cross-linked by a cross-linking agent usually used in a cross-linking of rubber and resins to form a cross-link such as a sulfur cross-link, a peroxide cross-link, a metal ion cross-link, a silane cross-link and a resin cross-link. Examples of the cross-linking agent are sulfur, phenol resins, metal oxides, metal hydroxides, methal chlorides, p-quinone dioxime and bismaleimide cross linking agents. The cross-linking agent may be used in combination with a cross-linking accelerator to control a cross-linking rate. Examples of the cross-linking accelerator are minium and oxidizing agents such as dibenzthiazoyl sulfide. The cross-linking agent may be used in combination with metal oxides such as zinc oxide, magnesium oxide, lead oxide and calcium oxide and dispersing agents such as stearic acid. Of these, preferred are lead oxide and magnesium oxide. The thermoplastic resin composition in accordance with the present invention can be dynamically cross-linked in the presence of the cross-linking agent to obtain a cross-linked composition.

Each of the thermoplastic resin and the olefin polymer used for producing the thermoplastic resin composition in accordance with the present invention may be used appropriately in combination with stabilizers such as age resistors, antioxidants, antiozonants, ultraviolet ray absorbers and light fastness agents and additives such as antistatic agents, slip agents, internal parting agents, colorants, dispersants, anti-blocking agents, lubricants and anti-fogging agents.

Examples of the above-mentioned lubricants are wax, higher alcohols, fatty acids, metal salts of fatty acids, fatty acid amides, carboxylic acid esters, phosphoric acid esters, metal sulfonates, metal salts of acid esters, acrylic resins, fluorine-containing resins and silicones. Two or more thereof may be used at the same time.

Examples of the above-mentioned wax are petroleum wax such as paraffin wax and micro-crystalline wax; vegetable wax such as rice wax; mineral wax such as montan wax; and synthetic wax such as polyethylene wax and low molecular weight polypropylene.

Examples of the above-mentioned higher alcohol are lauryl alcohol, myristyl alcohol, palmityl alcohol, stearyl alcohol, behenyl alcohol, oleyl alcohol, erucyl alcohol and 12 hydroxystearyl alcohol.

Examples of the above-mentioned fatty acid are lauric acid, palmitic acid, stearic acid, behenic acid, oleic acid, erucic acid, linolic acid and ricinolic acid.

Examples of the above-mentioned metal salt of fatty acid are Li, Na, Mg, Al, K, Ca, Zn, Ba and Pb salts and other metal salts of fatty acids such as lauric acid, palmitic acid, stearic acid, behenic acid, oleic acid, erucic acid, linolic acid and ricinolic acid. Specific examples thereof are lithium stearate, sodium stearate, calcium stearate and zinc stearate.

Examples of the above-mentioned fatty acid amide are lauric acid amide, palmitic acid amide, stearic acid amide, oleic acid amide, erucic acid amide, methylenebisstearic acid amide, ethylenebisstearic acid amide, ethylenebisoleic acid amide and stearyldiethanol amide.

Examples of the above-mentioned carboxylic acid ester are esters between carboxylic acids such as aliphatic carboxylic acids, fatty acids and oxycarboxylic acids and alcohols such as aliphatic alcohols, aromatic alcohols and polyhydric alcohols, the aliphatic carboxylic acids including, for example, acrylic acid, crotonic acid, isocrotonic acid, fumaric acid, maleic acid, succininc acid and aconitic acid, the fatty acids including, for example, lauric acid, palmitic acid, stearic acid, behenic acid, oleic acid, erucic acid, linolic acid and ricinolic acid, the oxycarboxylic acids including, for example, lactic acid, malic acid, tartaric acid and citric acid, and the aliphatic alcohols including, for example, myristyl alcohol, palmityl alcohol, stearyl alcohol, behenyl alcohol, and 12 hydroxystearyl alcohol, the aromatic alcohols including, for example, benzyl alcohol, β-phenylethyl alcohol and phthalyl alcohol, and the polyhydric alcohol including, for example, glycerol, diglycerol, polyglycerol, sorbitan, sorbitol, propylene glycol, polypropylene glycol, polyethylene glycol, pentaerythritol and trimethylolpropane. Specific examples of the carboxylic acid ester are glycerol monooleate, glycerol dioleate, polyethylene glycol monostearate and distearyl citrateate.

Examples of the above-mentioned phosphoric acid ester are monoalkyl esters, dialkyl esters and trialkyl esters of phosphoric acid and a higher alcohol. As a specific example thereof, a phosphoric acid ester, a trademark of AX-1, manufactured by Asahi Denka Kogyo K.K. can be given.

Examples of the above-mentioned acrylic resin are polymers having a structure unit derived from acrylic acid or acrylic acid esters such as methyl acrylate, ethyl acrylate, butyl acrylate and 2-ethylhexyl acrylate, and a structure unit derived from methacrylic acid or methacrylic acid esters such as methyl methacrylate, ethyl methacrylate, butyl methacrylate and 2-ethylhexyl methacrylate, as a main unit. As specific examples thereof, an acrylic resin, a trademark of METABLEN, manufactured by Mitsubishi Rayon Co., Ltd., and an acrylic resin, a trademark of KANEACE, manufactured by Kaneka Corporation are given.

Examples of the above-mentioned metal sulfonate are sodium stearylsulfonate, sodium laurylsulfonate, sodium dodecylbenzenesulfonate, sodium dodecylnaphthalenesulfonate, potassium stearylsulfonate, potassium laurylsulfonate, sodium dibutylsulfosuccinate, sodium di-2-ethylhexylsulfosuccinate, disodium lauryl sulfosuccinate and disodium lauryl polyoxyethylenesulfosuccinate.

Examples of the above-mentioned metal salt of acid ester are salts of sulfuric acid esters such as sodium lauryl sulfate and potassium lauryl sulfate, and salts of phosphoric acid esters such as sodium lauryl phosphate and potassium lauryl phosphate.

Examples of the above-mentioned fluorine-containing resin are polymers having a structure unit derived from fluorine-containing olefins such as tetrafluoroethylene, hexafluoropropylene, fluoroalkylethylene and perfluoroalkyl vinyl ether; fluorine-containing alkyl acrylates such as perfluoroalkylene acrylate and perfluoromethaalkylene acrylate; and fluorine-containing compounds such as fluorine-containing alkyl methacrylates as a main unit. Specific examples of the fluorine-containing resin are polytetrafluoroethylene and perfluoro(polyoxypropylene ethyl ether).

Examples of the above-mentioned silicone are polymers having a structure unit derived from siloxane derivatives such as dimethylsiloxane, methylphenylsiloxane and diphenylsiloxane as a main unit. Specific examples of the silicone are polydimethylsiloxane and polymethylphenylsiloxane.

Each of the thermoplastic resin and the olefin polymer used for producing the thermoplastic resin composition in accordance with the present invention may be used appropriately in combination with fillers such as glass fiber, carbon fiber, metal fiber, glass beads, asbestos, mica, calcium carbonate, potassium titanate whiskers, talc, aramide fiber, barium sulfate, glass flakes and fluororesins; and mineral oil softeners such as naphthene oil and paraffin mineral oil.

Additionally, it is permitted to use each of the thermoplastic resin and the olefin polymer used for producing the thermoplastic resin composition in accordance with the present invention in combination with a flame retarder. Examples of the flame retarder are inorganic compounds such as antimony flame retarders, aluminum hydroxide, magnesium hydroxide, zinc borate, guanidine flame retarders and zirconium flame retarders; phosphates and phosphorus compounds such as ammonium polyphosphate, ethylenebistris(2-cyanoethyl)phosphonium chloride, tris (tribromophenyl)phosphate, and tris(3-hydroxypropyl) phosphinoxide; chlorine-containing flame retarders such as chlorinated paraffin, chlorinated polyolefin and perchlorocyclopentadecane; and bromine containing flame retarders such as hexabromobenzene, ethylenebisdibromonorbornane-dicarboxyimide, ethylenebistetrabromophthalimide, tetrabromobisphenol-A derivatives, tetrabromobisphenol S and tetrabromodipentaerythritol. These flame retarders may be used each alone or in a mixture of two or more.

Additionally, it is permitted to use each of the thermoplastic resin and the olefin polymer used for producing the thermoplastic resin composition in accordance with the present invention in combination with a foaming agent, and it is possible to produce a foamed article using the thus obtained thermoplastic resin composition. Examples of the foaming agent are inorganic foaming agents such as sodium bicarbonate, ammonium bicarbonate and ammonium carbonate; nitroso compounds such as N,N'-dinitrosopentameethylenetetramine; azo compounds such as azocarbonamide and azoisobutylonitrile; and sulfonylhydrazides such as benzenesulfonylhydrazine, p,p'-oxybis (benzenesulfonylhydrazide), toluenesulfonylhydrazide and toluenesulfonylhydrazide derivatives. It is permitted to use the foaming agent in combination with a foaming coagent such as salicylic acid, urea and urea derivatives.

Additionally, it is permitted to use each of the thermoplastic resin and the olefin polymer used for producing the thermoplastic resin composition in accordance with the present invention in combination with a high frequency processing coagent such as a polar polymer. As the high frequency processing coagent, a copolymer of ethylene and at least one comonomer is exemplified. Examples of such a comonomer are monocarboxylic acids such as acrylic acid, methacrylic acid, ethacrylic acid and crotonic acid; dicarboxylic acids such as maleic acid, fumaric acid, itaconic acid and citraconic acid; monoesters of said dicarboxylic acid; methacrylates such as methyl methacrylate; acrylates such as methyl acrylate and ethyl acrylate; vinyl esters of saturated carboxylic acids such as vinyl acetate and vinyl propionate; and ionomers of these acids or esters.

Additionally, it is permitted to use each of the thermoplastic resin and the olefin polymer used for producing the thermoplastic resin composition in accordance with the present invention in combination with other resin components. Examples of the other resin compositions are rosin resins, polyterpene resins, synthetic petroleum resins, cumaron resins, phenol resins, xylene resins, styrene resins and isoprene resins.

The above-mentioned rosin resins include, for example, natural rosin, polymerized rosin, partially hydrogenated rosin, completely hydrogenated rosin, esterified products of these rosin (such as glycerol esters, pentaerithritol esters, ethylene glycol esters and methyl esters), and rosin derivatives (such as disproportionation rosin, fumaric acid-modified rosin and lime-modified rosin).

The above-mentioned polyterpene resins include, for example, cyclic terpene homopolymers such as α-pinene, β-pinene and dipentene; said cyclic terpene copolymers; copolymers of said cyclic terpene and phenol compounds such as phenol and bisphenol (for example, α-pinene-phenol resin, dipentene-phenol resin and terpene-bisphenol resin); and aromatic-modified terpene resins such as copolymers of said cyclic terpene and an aromatic monomer.

The above-mentioned synthetic petroleum resins include, for example, homopolymers and copolymers of $C_5$ fraction, $C_6$ to $C_{11}$ fractions and other olefin fractions of naphtha cracked oil; hydrogenated products of said homopolymers and copolymers, namely, aliphatic petroleum resins; aromatic petroleum resins; alicyclic petroleum resins; and aliphatic-alicyclic copolymer resins. The synthetic petroleum resins further include, for example, copolymer petroleum resins such as copolymers of the above naphtha cracked oil and the above terpene and hydrogenated products thereof.

Preferred examples of the $C_5$ fraction of the above-mentioned naphtha cracked oil are methylbutenes such as isoprene, cyclopentadiene, 1,3-pentadiene, 2-methyl-1-butene and 2-methyl-2-butene; pentenes such as 1-pentene and 2-pentene; and dicyclopentadiene. Preferred examples of the $C_6$ to $C_{11}$ fractions are methylstyrenes such as indene, styrene, o-vinyltoluene, m-vinyltoluene, p-vinyltoluene, α-methylstyrene and β-methylstyrene; methylindene; ethylindene; vinylxylene and propenylbenzene. Preferred examples of other olefin fractions are butene, hexene, heptene, octene, butadiene and octadiene.

The above-mentioned phenol resins include, for example, alkylphenol resins, alkylphenol-acetylene resins obtained by condenstion between an alkylphenol and acetylene and modified products of such resins. Incidentally, it is permitted to use either a novolak resin obtained by methylolation of phenol with an acid catalyst or a resol resin obtained by methylolation with an alkaline catalyst.

The above-mentioned xylene resins include, for example, xylene-formaldehyde resins obtained from m-xylene and formaldehyde and modified resins thereof obtained by reaction with a third component.

The above-mentioned styrene resins include, for example, lower molecular weight products of styrene, copolymer resins of α-methylstyrene and vinyltoluene and copolymer resins of styrene, acrilonitrile and indene.

The above-mentioned isoprene resins include, for example, dimers of isoprene, i.e. resins obtained by copolymerization of a $C_{10}$ alicyclic compound and a $C_{10}$ chain compound.

Among the above-mentioned various tackiness-imparting resins, the rosin resins, polyterpene resins and synthetic petroleum resins are preferred. Of these, those having an aliphatic structure and/or an alicyclic structure are more preferred from a viewpoint of transparency of an article molded from the resulting thermoplastic resin composition. Here, as particularly preferred tackiness-imparting resins having an aliphatic structure and/or an alicyclic structure, with respect to the rosin resins, partially hydrogenated rosin, completely hydrogenated rosin and derivative thereof; with respect to the polyterpene resins, homopolymers and copolymers of cyclic terpene; and with respect to the synthetic petroleum resins, aliphatic petroleum resins, alicyclic petroleum resins and copolymers of hydrogenated products of naphtha cracked oil and various terpene are exemplified. It is permitted to use these resin components each alone or in a mixture of two or more. It is permitted to use commercially available ones as these resin components.

The thermoplastic resin composition in accordance with the present invention can be used as a layer forming a mono-layered sheet or film (the sheet and the film are hereinafter referred to "sheet") and a multi-layered sheet (laminate). Materials constituting respective layers of the laminate may be the same or different from one another. Examples of the materials other than the thermoplastic resin composition in accordance with the present invention are resins such as polyethylene resins, polypropylene resins, polybutene resins, polymethylpentene resins, polystyrene resins, copolymer resins of ethylene and acrylic acid monomers, copolymer resins of ethylene and vinyl acetate monomers, copolymer resins of ethylene and methacrylic acid monomers, acrylic resin, polyester resin, polycarbonate resin, nylon resin and polyvinyl alcohol resin; rubber such as ethylene/α-olefin copolymer rubber, ethylene/α-olefin/polyene copolymer rubber, styrene rubber, hydrogenated styrene rubber, diene rubber and known cross-linkable rubber; and materials such as woven fabric and nonwoven fabric.

Each of the above-mentioned resins and rubber may be used appropriately in combination with components such as stabilizers, additives, fillers, mineral oil softeners, flame retarders, high-frequency processing auxiliaries, rosin resins, polyterpene resins, synthetic oil resins, cumarone resins, phenol resins, xylene resins and isoprene resins.

The above-menltioned respective layers maybe cross-linked to form a cross-link such as a sulfur cross-link, a peroxide cross-link, a metal ion cross-link, a silane cross-link and a resin cross-link, or may be foamed, by a process known in the art. If desired, an adhesive-carrying layer may be sandwiched between respective layers of the laminate.

The thermoplastic resin composition in accordance with the present invention can be produced by a process such as a melt blending process, wherein respective components are kneaded using a usual kneading apparatus such as a rubber mill, Brabender mixer, Banbury mixer, pressure kneader and a twin screw extruder. The apparatus may be a closed type or an open type. Of these, preferable is a closed type apparatus capable of being purged with an inert gas.

A kneading temperature is usually from 160 to 250° C., and preferably from 180 to 240° C. Kneading time depends upon a kind and an amount of the components used and a kind of the kneading apparatus. When an apparatus such as a pressure kneader and Bambury mixer is used, it is usually about 3 to 10 minutes. The kneading can be carried out, for example, by a process comprising the step of kneading respective components all together, or by a multi-step divisional kneading process comprising the steps of (i) kneading optional parts of components to obtain a mixture, and (ii) further kneading the mixture with the remaining parts.

The thermoplastic resin composition in accordance with the present invention is preferably a pellet in its shape from a viewpoint of transference and transportation. The pellet can be produced, for example, by a known process comprising the steos of (i) melt-kneading uniformly and extruding the resin composition with an extruder, and (ii) hot-cutting or strand-cutting to obtaining a pellet having a form such as a spherical, cylindrical or lens form. The cutting process may be an underwater-cutting process or an in-air-cutting process.

When an apparatus capable of forming a strand having an outer layer and an inner layer, wherein the respective layers are constituted with polymers different from each other, is used, it is able to obtain a twofold structure strand comprising an outer layer containing the thermoplastic resin and an inner layer containing the olefin polymer in accordance with the present invention. Such a strand can produce a pellet which is low in its self-adhesive property.

It is able to produce a cubic pellet by a process comprising the steps of (i) melt-blending uniformly the thermoplastic resin and the olefin polymer in accordance with the present invention to obtain a mixture, (ii) molding the mixture with a roll to obtain a sheet, and (iii) treating the sheet with a sheet pelletizer. From a viewpoint of controlling a weighing error, preferable is a pellet having a length of the longest portion of not longer than 3 cm.

In order to prevent a cross-linking phenomenon due to a self-adhesion of pellets, preferable is a pellet whose surface is covered with at Least one compound selected from the group consisting of calcium carbonate, barium carbonate, silica, talc, stearic acid and polyolefin powder. An amount of the compound to be covered can be suitably determined depending upon a size and shape of the pellet, and preferred is usually from 0.05 to 3 parts by weight based on the weight of the pellet comprising the thermoplastic resin composition. When the amount is less than 0.05 part by weight, the effect of preventing the self-adhesion is low. When it exceeds 3 parts by weight, the thermoplastic resin composition obtained deteriorates in its physical properties, and its production cost increases.

The thermoplastic resin composition in accordance with the present invention can be primarily processed into a molded product such as a pipe and a joint, or into an article such as a film, a sheet, a hose and a tube according to a conventional process such as extrusion molding, profile extrusion molding, multi-colored extrusion molding, cover (cored) extrusion molding, injection molding, compression molding, foaming, blow molding, powder molding, calendering, kneading process and tubular film process.

Examples of the above-mentioned powder molding are slush molding, fluidized-bed processing, electrostatic coating, powder thermal spraying and powder-rotating molding.

The molded article comprising the thermoplastic resin composition in accordance with the present invention can be subjected to a conventional surface treatment such as coating and vapor deposition.

The above-mentioned calendering contains, for example, sheeting wherein a flat sheet having high thickness accuracy can be continuously produced; doubling wherein a sheet having no pinhole and high thickness accuracy can be continuously produced; topping wherein a composite can be continuously produced by laminating cloth and a sheet; friction processing wherein a thermoplastic elastomer is rubbed into cloth to improve adhesion property; and profiling wherein a sculptured pattern on a roll surface can be continuously impressed on a sheet surface.

The above-mentioned primarily processed product can be commercialized through a step such as bending, cutting, severing, grinding, punching, drawing, engraving, press-processing, hot stamping, high-frequency processing, ultrasonic processing, laminating, sewing/lapping seam/hand knitting, vacuum molding, press molding, adhesion, welding, flocking, lining, slitting, printing and surface-coating.

The thermoplastic resin composition in accordance with the present invention can be applied, based on its superior characteristic feature, for uses such as vehicle parts, electric and electronic instrument parts, electric wires, building materials, necessities for agricultural, marine or horticultural use, necessities for chemical industrial use, materials for engineering use, materials for commercial or industrial use, furniture, writing materials, necessities for dairy or miscellaneous use, clothes, containers and necessities for wrapping use, tools, necessities for leisure use and necessities for medical use.

The above-mentioned vehicle parts include, for example, car interior skins such as instrumental panels, doors, pillars and air bag covers; car exterior parts such as over-fenders, clouding panels, roof rails and side mauls; hoses; tubes; gaskets; packing; weather strips; seal sponges of every kind; drain tubes for washing liquid; cushioning materials for a fuel tank; and bicycle parts.

The above-mentioned electric and electronic instrument parts include, for example, electric machine parts, electronic parts, weak electric parts, home electric parts, necessities for refrigerators; illumination instruments; and electric covers.

The above-mentioned electric wires include, for example, plastic cables, insulation wires and wire-protecting materials.

The above-mentioned building materials include, for example, those used for walls and ceilings such as ribs, baseboards, panels and tarpaulins; those used for roofs such as corrugated sheets, conduits and materials for roof foundation use; those used for floors such as materials for threshold use and tiles; those used for waterproofing such as pointing, pointing rods and waterproofing sheet, those used for accommodations and apparatus parts such as ducts, cable ducts, prefab materials and septic tanks; those used for structures and fixtures such as building edges, building gaskets, carpet holders, angles and louvers; and those used for industrial materials such as joiners and curing sheets.

The above-mentioned necessities for agricultural, marine or horticultural use include, for example, those used for agricultural hoses.

The above-mentioned materials for commercial or industrial use include, for example, machine covers, machine parts, packing, gaskets, flanges, leather duck, bolts, nuts, valves, metal-protecting films and convexo-concave hoses.

The above-mentioned furniture includes, for example, cabinets, stools, sofas, mats, curtains and table clothes.

The above-mentioned writing materials include, for example, card cases, pencil cases, accessories, key cases, cashing card cases, stickers, labels, book covers, notebook covers, binders, notebooks, covers, files, cards, commutation tickets, pads, holders, magazine trays, albums, templates and pen holders.

The above-mentioned necessities for dairy or miscellaneous use include, for example, bath lids, drainboards, buckets, dress covers, bedding covers, umbrellas, umbrella covers, reed screens, sewing requisites, shelf boards, shelf supports, tablets, aprons, trays, tapes, cords, belts and bags.

The above-mentioned clothes include, for example, rain coats, mackintoshes, rain gear sheets, leather coats for children, shoes, shoes covers, footwear, globes, skiwear, hats and supplemental materials for hats.

The above-mentioned containers and necessities for wrapping use include, for example, food containers, goods used for packing clothes, wrapping and packing materials, bottles for cosmetics, containers for cosmetics, vials for medicines, bottles for foods, bottles for physics and chemistry, bottles for detergents, containers, caps, hood packs, laminate films, industrial shrinking films and wrapping films for business use.

The above-mentioned necessities for medical use include, for example, liquid transport bags, continuously portable bags for peritoneal dialysis and blood-bags.

The thermoplastic resin composition in accordance with the present invention can be blended with or laminated on a material having an insufficient damping property to improve the damping property thereof.

The thermoplastic resin composition in accordance with the present invention can be used as a component for improving flexibility of a thermoplastic elastomer, like the above-mentioned olefin polymer in accordance with the present invention.

EXAMPLE

The present invention is explained with reference to Examples, which are not intended to limit the scope of the present invention.

Example 1

In a 100 litter-volume SUS polymerization reactor equipped with a stirrer, ethylene, propylene and 1-butene were continuously copolymerized in the following manner using hydrogen as a chain transfer agent, thereby obtaining an ethylene-propylene-1-butene copolymer.

From a lower part of the polymerization reactor, hexane as a solvent, ethylene, propylene and 1-butene were continuously fed at feeding rates of 83 litters/hour, 0.20 kg/hour, 12.00 kg/hour and 1.33 kg/hour, respectively.

From an upper part of the reactor, the reaction mixture was continuously drawn out, so that 100 litters of the reaction mixture remain in the reactor.

From a lower part of the reactor, as components of a polymerization catalyst, dimethylsilyl(tetramethylcyclopentedienyl)(3-tert-butyl-5-methyl-2-phenoxy)titanium dichloride represented by the following formula, triphenylmethyltetraxis(pentafluorophenyl) borate and triisobutylaluminum were continuously fed at feeding rates of 0.005 g/hour, 0.260 g/hour and 1.654 g/hour, respectively.

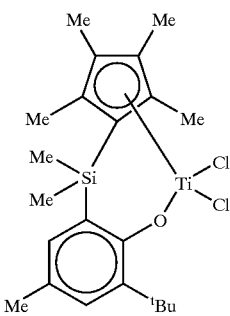

The copolymerization reaction was carried out at 38° C., while circulating cool water in a jacket equipped to an outer portion of the reactor.

A small amount of ethanol was added to the reaction mixture continuously drawn out from the upper part of the reactor in order to discontinue the polymerization reaction. Thereafter, the steps of removing of monomer, washing with water, and successive removal of the solvent by means of steam in a large amount of water were carried out to obtain an ethylene-propylene-1-butene copolymer. The copolymer was dried at 80° C. under reduced pressure for a whole day and night. A production rate of the copolymer was found to be 2.90 kg/hour.

The obtained ethylene-propylene-1-butene copolymer was analyzed as follows. The results are as shown in Table 1.

(1) Composition of Ethylene-propylene-1-butene Copolymer

According to a qualitative analysis of IR analysis, a rolling vibration due to the methylene group of the ethylene unit, that due to the methyl group of the propylene unit, and that due to the methyl group in the ethyl group of the 1-butene unit were observed at 720 cm$^{-1}$, 1154 cm$^{-1}$ and 770 cm$^{-1}$, respectively. Based on the observation results, the obtained copolymer was confirmed to have the ethylene, propylene and 1-butene units.

With respect to a quantitative analysis, using an apparatus, a trademark of AC-250, manufactured by Bruker Co., the following steps (i) and (ii) were carried out to find the composition.

(i) Firstly, a composition ratio of the propylene unit to the 1-butene unit is calculated from a ratio of a spectral strength of carbon due to the methyl group in the propylene unit to that due to the methyl group in the 1-butene unit, both strength being found in $^{13}$CNMR spectra.

(ii) Secondly, a composition ratio of the ethylene, propylene and 1-butene units is calculated from a ratio of a spectral strength of hydrogen due to the methine group and the methylene group to that due to the methyl group, both strength being found in $^1$HNMR spectra.

(2) Intrinsic Viscosity [η]

It was measured according to a process comprising the steps of:

(i) dissolving 300 milligrams of a sample in 100 ml of tetralin to obtain a solution, (ii) diluting the solution to ½, 1/3 and ⅕, (iii) measuring the diluted solution three times in an oil bath at a constant temperature of 135° C. (±0.1° C.) using Ubbelohde viscometer to find their viscosity, and (iv) regarding an average value thereof as its intrinsic viscosity [η].

(3) Measurement of Molecular Weight Distribution

Using a solution obtained by dissolving about 5 mg of a sample in 5 ml of o-dichlorobenzene, it was measured according to a gel permeation chromatography (GPC) under conditions as described below.

(i) As a GPC apparatus, an apparatus, a trademark of 150C/GPC, manufactured by Waters Co., is used.

(ii) As a column, a column, a trademark of SODEX PACKED COLUMN A-80M, manufactured by Showa Denko K.K. is used.

(iii) 400 Micro-litters of the above-mentioned solution is injected.

(iv) An elution temperature is adjusted to 140° C.

(v) A flow rate of the solution eluted is controlled to 1.0 ml/min.

(vi) As a detector, a refractivity detector is used.

(vii) As a molecular weight standard reference material, polystyrene of molecular weights of 68–8,400,000, manufactured by Tosoh Corporation is used.

(viii) From a weight average molecular weight (Mw) and a number average molecular weight (Mn) of the sample, each of which average molecular weights is obtained as a converted molecular weight in terms of the molecular weight of the above-mentioned polystyrene, a molecular weight distribution (Mw/Mn) is calculated.

(4) Measurement by Differential Scanning Calorimeter (DSC)

It was carried out using a differential scanning calorimeter, a trademark of DSC 220C, manufactured by Seiko Instruments Inc., at temperature raising and descending rates of 10° C./min.

Comparative Example 1

Ethylene, propylene and 1-butene were copolymerized at a polymerization temperature of 50° C. under a polymerization pressure of 8 Kg/cm$^2$ using a catalyst comprising a combination of (1) triisobutylaluminum, (2) N,N-dimethylaniliniumtetraxis(pentafluoro)phenyl borate and (3) dimethylsilyl(tetramethylcyclopentadienyl) (3-tert-butyl-5-methyl-2-phenoxy)titanium dichloride as a polymerization catalyst, and using hexane as solvents for polymerization and catalyst preparation. A molar ratio of the above-mentioned catalyst components (1) to (3) was component (1): component (2): component (3)=633: 28: 1. The obtained ethylene-propylene-1-butene copolymer was analyzed in the same manner as in Example 1. The results are as shown in Table 1.

Example 2 and Comparative Examples 2 to 4

Components as shown in Table 2 were kneaded in blending proportions (parts by weight) as shown in Table 2 at a screw rotating speed of 10 rpm at 200° C. for 5 minutes using a kneader, a trademark of PLASTI-CORDER PLV Type 151, manufactured by Brabender OHG. Successively, kneading was additionally continued at 100 rpm for 5 minutes, thereby obtaining a thermoplastic resin composition. Physical properties of the resin composition were determined as follows, and the results are as shown in Table 2.

(1) Elastic Recovery

Using a dumbbell shaped No. 1 test piece (gauge length=40 mm, thickness=0.5 mm) conformed to JIS K6251, and using a testing machine, a trademark of STROGRAPH R, manufactured by Toyo Seiki Co., Ltd., it was measured according a process comprising the steps of:

(i) stretching the test piece at a cross head speed of 200 mm/min. until a stretch deformation reaches 100% (gauge length 80 mm), (ii) reversing the cross head immediately after the stretching, and shrinking the test piece at a cross head speed of 200 mm/min. until the stress reaches 0(zero) to obtain a chart, (iii) from the chart, reading measures corresponding to the stretch deformation and the stress-residual recovery, respectively, and (iv) repeating the above-mentioned steps with respect to additional two test pieces, and regarding an arithmetic mean of the values obtained as a result of measurement.

(2) Haze Value (HAZE)

A haze value (HAZE) of a sheet having a thickness of 1 mm obtained through press-molding according to JIS K6758 was measured according to JIS K7105.

(3) Aging Test

It was measured by heating test pieces hanging in a testing machine according to an "6.3 Air-heating aging test" prescribed in JIS K6301, except that a temperature and time for the test were changed to 23° C. and 100 hours, respectively. The test pieces hanging in the testing machine were prohibited to contact with one another and touch to the wall of the testing machine.

(4) Difference of Haze Value (ΔHAZE (23))

The difference between a haze value of the test piece (sheet of 1 mm thickness) tested according to the above (3) and a haze value of said test piece measured within 2 hours after molding was regarded as the difference of haze value (ΔHAZE (23)), provided that the former haze value was a minuend and the latter was a subtrahend.

(5) Hardness

Durometer hardness (Duro-A) according to JIS K6253 and Shore-D according to ASDM 2240 were measured.

(6) Stability of Surface Properties

Stickiness and blur occurring on the surface of the test piece, which had been tested according to the above-mentioned (3), were compared with those of the test piece before the test, and judged on the basis of the following criteria:

X: Stickiness and blur are observed,

Δ: blur is observed, and

○: neither stickiness nor blur is observed.

(7) Resistance to Whitening on Bending

Degree of whitening of a sheet at the time of bending at an angle of 180° was visually observed, and judged on the basis of the following criteria:

X: Whitening is observed, and

○: no whitening is observed.

(8) Scratch Resistance Test

It was carried out according to a process comprising the steps of:

(i) scratching a surface of a press sheet having a 2 mm thickness with a scratching needle of a surface property measuring machine, a trademark of TRIBOGEAR, manufactured by Shinto Kagaku Co., to which needle a load of 200 g is applied, and (ii) measuring the scratch depth in am with a contact type surface roughness measuring instrument, a trademark of SURFCOM, manufactured by Tokyo Seimitsu Co., Ltd.

TABLE 1

|  | Example 1 | Comparative Example 1 |
|---|---|---|
| Ethylene unit content (mol %) | 8 | 21 |
| Propylene unit content (mol %) | 88 | 50 |
| 1-Butene unit content (mol %) | 4 | 29 |
| Melting temperature of crystal (° C.) | None | None |
| Crystal melting calorie (mj/mg) | None | None |
| Crystallization temperature (° C.) | None | None |
| Crystallization calorie (mj/mg) | None | None |
| Intrinsic viscosity [η] (dl/g) | 3.0 | 1.3 |
| Mw/Mn | 2.3 | 2.2 |

TABLE 2

|  | Example | Comparative Example | | |
|---|---|---|---|---|
|  | 2 | 2 | 3 | 4 |
| Component |  |  |  |  |
| Copolymer of Example 1 | 70 | — | — | — |
| Copolymer of Comparative Example 1 | — | 70 | 70 | — |
| PP-1(Note 1) | 30 | 30 | — | 100 |
| PP-2(Note 2) | — | — | 30 | — |
| Property |  |  |  |  |
| Hardness |  |  |  |  |
| Duro A | 77.8 | 77.9 | — | — |
| Shore D | 28.4 | 25.2 | — | — |
| Elastic recovery (%) | 83.5 | 67.7 | 69.5 | — |
| Difference of haze value | 4.0 | 52.4 | — | — |
| Scratch depth (μm) | 8.3 | 17.4 | — | — |
| Resistance to whitening on bending | ○ | ○ | — | X |

Note 1
PP-1: A propylene-ethylene random copolymer resin having an ethylene unit of 3% by weight, its MI measured at 230 C° C. under a load of 2.16 kg being 2.8 g/10 min., its peak position (melting point) in crystal melting measured according to JIS K7121 using a differential scanning calorimeter (DCS) being 144.1° C,, and its crystal melting calorie measured according to JIS K7122 using a differential scanning calorimeter (DSC) being 83.9 J/g.
Note 2
PP-2: A propylene-ethylene random copolymer resin having an ethylene unit of 5% by weight, its MI measured at 230 C° C. under a load of 2.16 kg being 1.5 g/10 min., its peak position (melting point) in crystal melting measured according to JIS K7121 using a differential scanning calorimeter (DCS) being 134.9° C,, and its crystal melting calorie measured according to JIS K7122 using a differential scanning calorimeter (DSC) being 59.6 J/g.

What is claimed is:

1. An olefin polymer having an elastic recovery of from 70 to 100% defined by the following formula (1), Elastic recovery=stress-residual deformation recovery×100/stretch deformation    (1)

wherein the stress-residual deformation recovery and the stretch deformation are obtained from a 100% strain hysteresis curve of a resin composition consisting essentially of 70 parts by weight of the olefin polymer and 30 parts by weight of one polypropylene resin selected from the group consisting of the following polymers (A) and (B), provided that at least one resin composition satisfies the above-defined value of elastic recovery, (A) a propylene-ethylene copolymer, which has a melt flow rate of 3.0±0.5 g/10 min. measured at a temperature of 230° C. under a load of 2.16 kg, a main peak position (melting point) of 145±2° C. in a crystal melting measured according to JIS K7121 with a differential scanning calorimeter (DSC), and a crystal melting calorie of 87±5 J/g measured according to JIS K7122 with a differential scanning calorimeter (DSC), and (B) a propylene-ethylene copolymer, which has a melt flow rate of 1.5±0.3 g/10 min. measured at a temperature of 230° C. under a load of 2.16 kg, a main peak position (melting point) of 135±2° C. in a crystal melting measured according to JIS K7121 using a differential scanning calorimeter (DSC), and a crystal melting calorie of 60±5 J/g measured according to JIS K7122 with a differential scanning calorimeter (DSC), wherein the sample to be measured with a differential scanning calorimeter is prepared according to a process prescribed in JIS K7121 3(2).

2. The olefin polymer according to claim 1, wherein the olefin polymer comprises a random copolymer.

3. A thermoplastic resin composition comprising from 99 to 1% by weight of the olefin polymer according to claim 1 and from 1 to 99% by weight of a thermoplastic resin.

4. A sheet comprising the thermoplastic resin composition according to claim 3.

5. A laminate comprising a layer containing the thermoplastic resin composition according to claim 3.

6. A tube comprising the thermoplastic resin composition according to claim 3.

* * * * *